(12) United States Patent
Yokota

(10) Patent No.: US 6,903,849 B2
(45) Date of Patent: Jun. 7, 2005

(54) IMAGE READING APPARATUS

(75) Inventor: Masahiko Yokota, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 612 days.

(21) Appl. No.: 09/818,557

(22) Filed: Mar. 28, 2001

(65) Prior Publication Data
US 2001/0040705 A1 Nov. 15, 2001

(30) Foreign Application Priority Data

Mar. 31, 2000 (JP) ........................................ 2000-096181
Mar. 22, 2001 (JP) ........................................ 2001-083303

(51) Int. Cl.$^7$ ............................. H04N 1/04; G06K 7/00; H01L 27/00
(52) U.S. Cl. ...................... 358/497; 358/474; 358/484; 358/494; 382/312; 250/208.1
(58) Field of Search ................................. 358/497, 474, 358/494, 482; 382/312; 250/208.1

(56) References Cited

U.S. PATENT DOCUMENTS 4,965,638 A * 10/1990 Hediger ...................... 358/497
5,038,028 A * 8/1991 Boyd et al. ............... 250/208.1
5,887,867 A 3/1999 Takahashi et al. .......... 271/117
6,330,084 B1 * 12/2001 Chiang ....................... 358/497

FOREIGN PATENT DOCUMENTS

JP 61-149920 7/1986
JP 9-270895 10/1997

* cited by examiner

Primary Examiner—Edward Coles
Assistant Examiner—Houshang Safaipour
(74) Attorney, Agent, or Firm—Fitzpatrick, Cella, Harper & Scinto

(57) ABSTRACT

An image reading apparatus includes an image reading unit for reading image information of an original resting on an original resting portion, wherein, at the time of reading, the image reading unit moves along the original resting portion, and a flat cable electrically connecting the image reading unit to the main body of the image reading apparatus to transmit the image information read by the image reading unit to the main body of the image reading apparatus, wherein the width direction of the flat cable includes a component in a direction perpendicular to the original resting surface.

9 Claims, 11 Drawing Sheets

IMAGE READING APPARATUS

BACKGROUND OF THE INVENTION

1. Field of the Invention

The present invention relates to an image reading apparatus for reading image information of an original resting on an original resting portion and, in particular, to an image reading apparatus to be used in an image scanner, a facsimile apparatus or the like. Further, the present invention relates to an image reading apparatus to be used in an image forming apparatus, such as a copying machine, for forming images by the electrophotographic system, electrostatic recording system, etc.

2. Related Background Art

Conventionally, Japanese Patent Application Laid-Open No. 61-149920 and Japanese Patent Application Laid-Open No. 9-270895 propose apparatuses which perform scanning while holding a contact image sensor serving as the image reading means in contact with the back surface of an original glass stand serving as the light transmitting member.

These publications disclose typical examples of the technique for scanning an image by a contact image sensor, providing a description of a connection cable for exchanging signals between the contact image sensor and an image processing portion serving as the image processing means. In Japanese Patent Application Laid-Open No. 9-270895, a flat cable is adopted as the connection cable.

FIG. 10 shows the construction of a conventional apparatus. Reference Numeral 109 designates an image reading apparatus, reference numeral 110 designates an original glass stand, and reference numeral 101 designates a contact image sensor which has a width smaller than that of the original glass stand 110 and which includes a halogen lamp 111 as the light source. Reference numeral 102 designates an inverter board for controlling the halogen lamp; a DA converter is mounted thereon.

Reference numeral 103 designates a flat cable for supplying a digital image signal output from the inverter board and a signal from the halogen lamp to a main-body side control board serving as the image processing portion (not shown).

Reference numeral 104 designates a carriage for supporting the contact image sensor 101 while holding it in close contact with the back surface of the original glass stand 110. The carriage 104 and the contact image sensor 101 constitute an image reading unit.

Reference numeral 106 designates a stepping motor. The carriage 104 is reciprocated in the sub-scanning direction along a guide shaft 107 by a timing belt 105. Reference numeral 108 designates a backup pulley for securing the timing belt 105 in position with a predetermined tension.

The width of the contact image sensor 101 is somewhat larger than a width of the maximum original to be read. The connector portion thereof, to which the flat cable 103 is connected, is usually arranged within the original readable range.

In the case of the apparatus construction shown in FIG. 10, when the connecting portion of the flat cable is connected to the connector portion, reciprocation of the image reading unit in the sub-scanning direction causes the flat cable 103 to be bent below the original glass stand 110.

At this time, as shown in FIG. 11, the flat surface of the flat cable 103 moves while in contact with the back surface of the original glass stand 110.

When this image reading apparatus is left to stand for a long period of time in an ordinary installation place, such as an office, a very small quantity of dust in the air may be attracted by static electricity generated on the surface of the flat cable 103, thereby blackening the surface of the flat cable 103 after a while.

And, the entire flat portion of the blackened flat cable 103 may come into contact with the back surface of the original glass stand 110, thereby soiling the back surface of the original glass stand 110. When the back surface of the original glass stand 110 is soiled, the stain on the back surface of the original glass stand 110 will also be read when image reading is performed, resulting in defective image reading.

It might be possible to cause the flat cable 103 to inflect outside the image readable region. In that case, however, it is necessary that there should be no protrusions such as screws in the inflecting range of the flat cable 103. Further, it is necessary to additionally provide a movement range for the flat cable 103 outside the movement range for the contact image sensor 101, resulting in an increase in apparatus size.

SUMMARY OF THE INVENTION

It is an object of the present invention to provide an image reading apparatus in which it is possible to make the contact area between the flat cable and the back surface of the original resting portion as small as possible.

Other objects of the present invention will become apparent from the following detailed description.

DESCRIPTION OF THE PREFERRED EMBODIMENTS

Preferred embodiments of the present invention will now be described in detail with reference to the drawings. The dimensions, material, configurations, and positional relationship of the components should not be restrictively construed unless particularly specified.

(First Embodiment)

Figure 1:
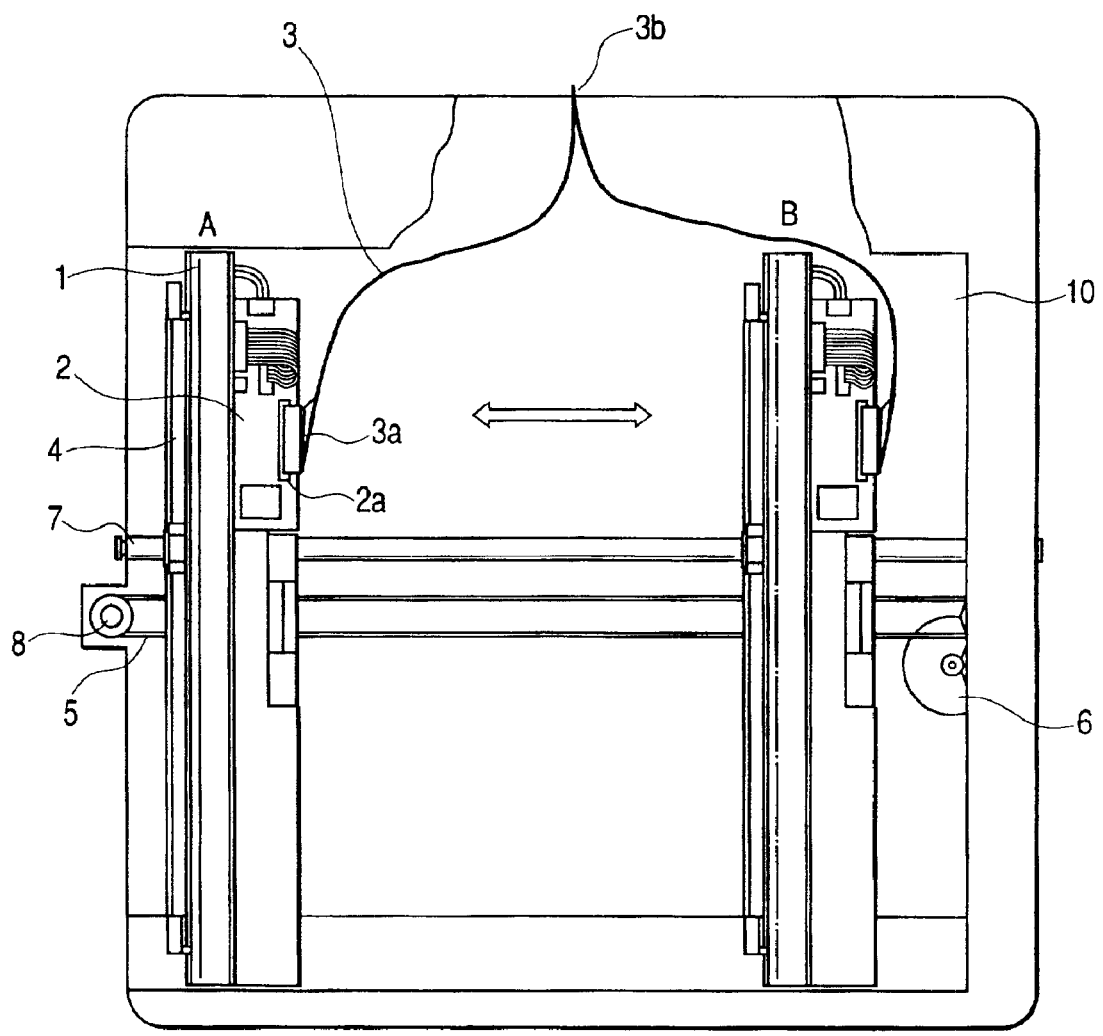
FIG. 1 is a plan view showing an image reading apparatus according to a first embodiment of the present invention.

The first embodiment of the present invention will be described with reference to FIGS. 1, 2, and 8. In the drawings, reference numeral 1 designates a contact image sensor (hereinafter referred to as CIS) serving as an image reading sensor having a resolution of approximately 400 to 600 dpi (dot/inch) and containing a xenon tube 11 serving as a light source for applying light to the original glass stand 10.

Reference numeral 2 designates an inverter circuit board for supplying power to the xenon tube 11. The inverter circuit board has a DA converter (digital-analog converter) for converting an analog signal from the CIS 1 into a digital signal and serves as a relay board.

Reference numeral 3 designates a belt-shaped flat cable serving as a connection cable. When signal transmission is conducted through the flat cable 3 by the CIS 1 of this embodiment, having a resolution of approximately 400 to 600 dpi, the cable width is not less than 25 mm. Thus, it is often connected to a connector 2a of the CIS 1 so as to extend parallel to the original glass stand 10 serving as the original resting portion, i.e., in the horizontal direction. The width direction of the flat cable means the above-mentioned cable width direction (which corresponds to the X-direction of FIG. 3), and is provided with a component in a direction perpendicular to the original resting surface.

The flat cable 3 is connected to the connector 2a, which is horizontally arranged on the inverter circuit board 2, and is vertically twisted at a bending portion 3a so as to be perpendicular to the original glass stand 10 serving as the light transmitting member.

After a portion of the flat cable 3 has become vertical, the portion of the flat cable 3 is electrically connected to an image processing portion 50 serving as an image processing means for processing original image information read by the image reading apparatus main body, that is, the CIS 1, through an opening 3b provided near the center of the rear portion of the image reading apparatus.

Reference numeral 4 designates a carriage serving as an image reading unit, which elastically supports the CIS 1 and the light source 2 through a spring 30 serving as a biasing member, and holds the CIS 1 so that the CIS 1 is perpendicular to the guide shaft 7. Further, when the image information of an original is read, the image reading unit moves in the sub-scanning direction with respect to the original resting on the original glass stand 10, and slides on the back surface of the original glass stand 10. Further, a regulating member for regulating the distance between the CIS 1 and the original glass stand 10 is provided on the upper side of an end portion with respect to the main scanning direction of the image reading unit. In this embodiment, the length of the regulating member as measured in the vertical direction is approximately 1 mm.

The carriage 4 is capable of reciprocating with the CIS 1 between the positions A and B in the sub-scanning direction along the guide shaft 7. When image reading is started, the carriage 4 is at the position A (it is also at this position when it is on standby), reads an image while moving at a predetermined speed, and finally reaches the position B (when the image reading is completed). And, for the next image reading, the carriage 4 is restored to the position A.

Reference numeral 5 designates a timing belt, which is connected to the carriage 4 to maintain a fixed tension constant by a driven pulley 8. The timing belt 5 reciprocates the carriage 4 by a stepping motor 6.

Figure 2:
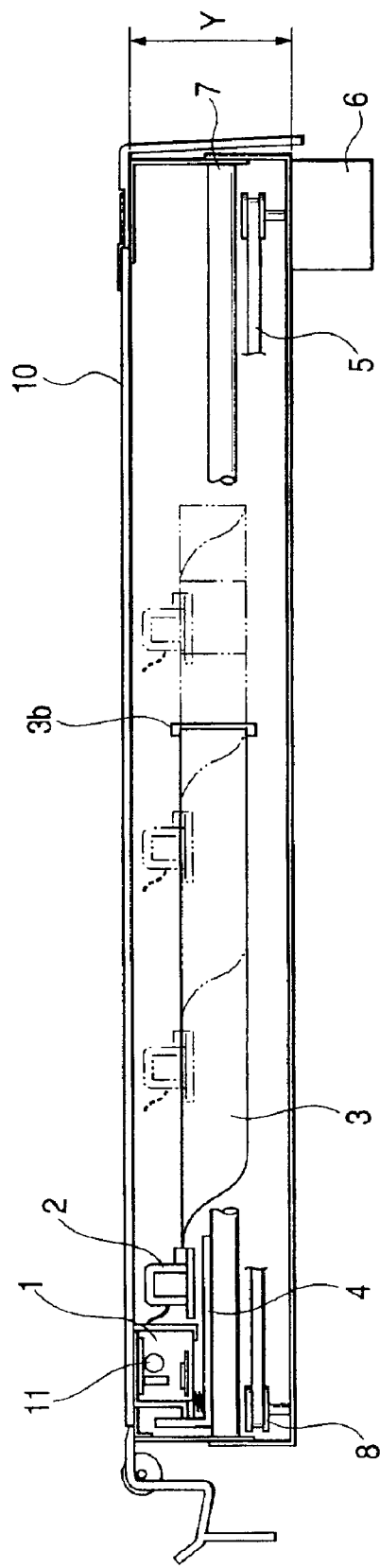
FIG. 2 is a sectional view of the image reading apparatus of the first embodiment.

As shown in FIG. 2, in this embodiment, the distance Y from the bottom surface of the image reading apparatus to the lower surface of the original glass stand 10 is 40 mm. As described below, the space for allowing the flat cable to escape when it inflects is small. The present invention proves particularly effective when the distance from the bottom surface of the image reading apparatus to the lower surface of the original glass stand 10 is not more than 50 mm.

Figure 8:
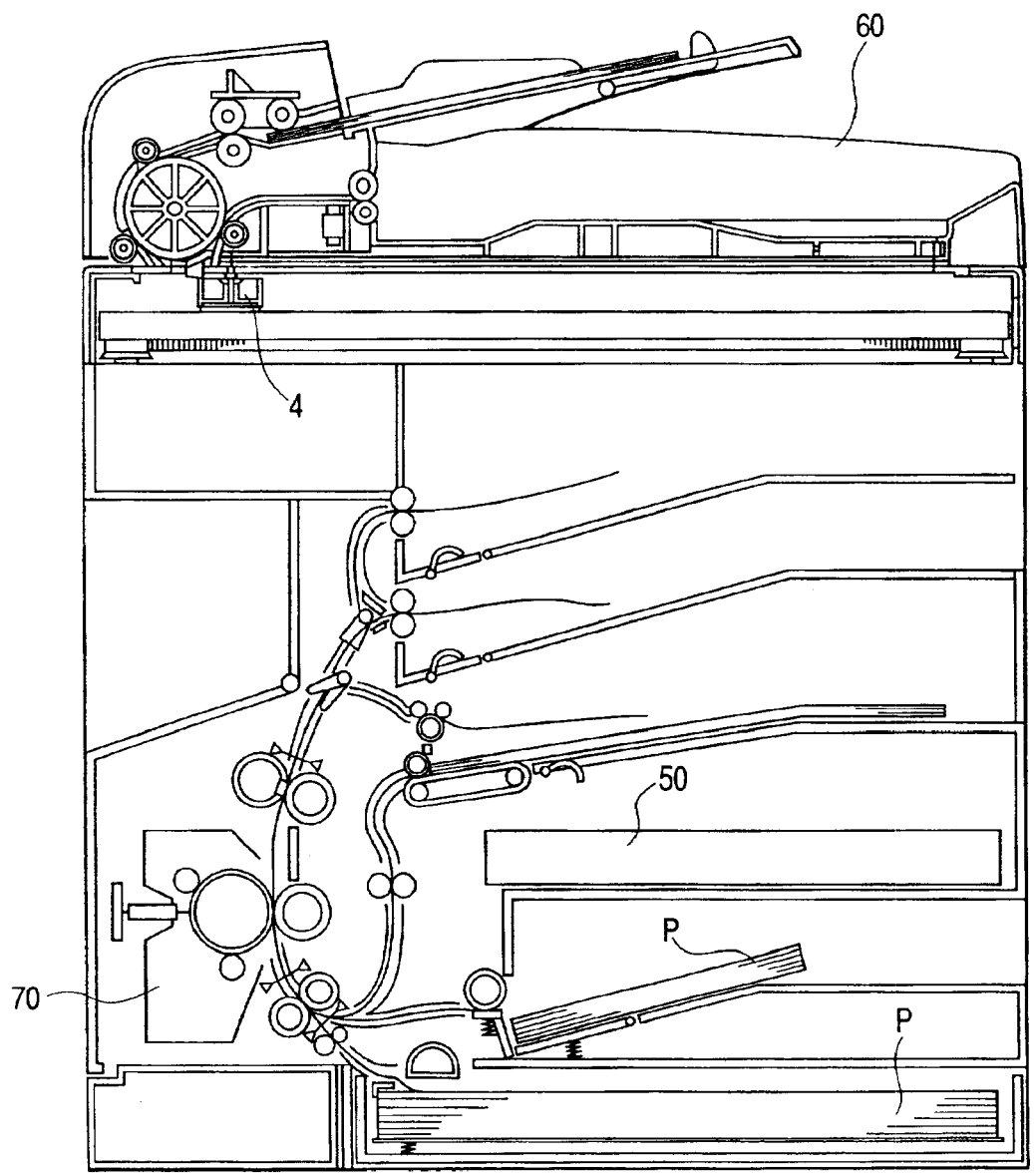
FIG. 8 is a schematic sectional view showing an image forming apparatus having an image reading apparatus.
Figure 9:
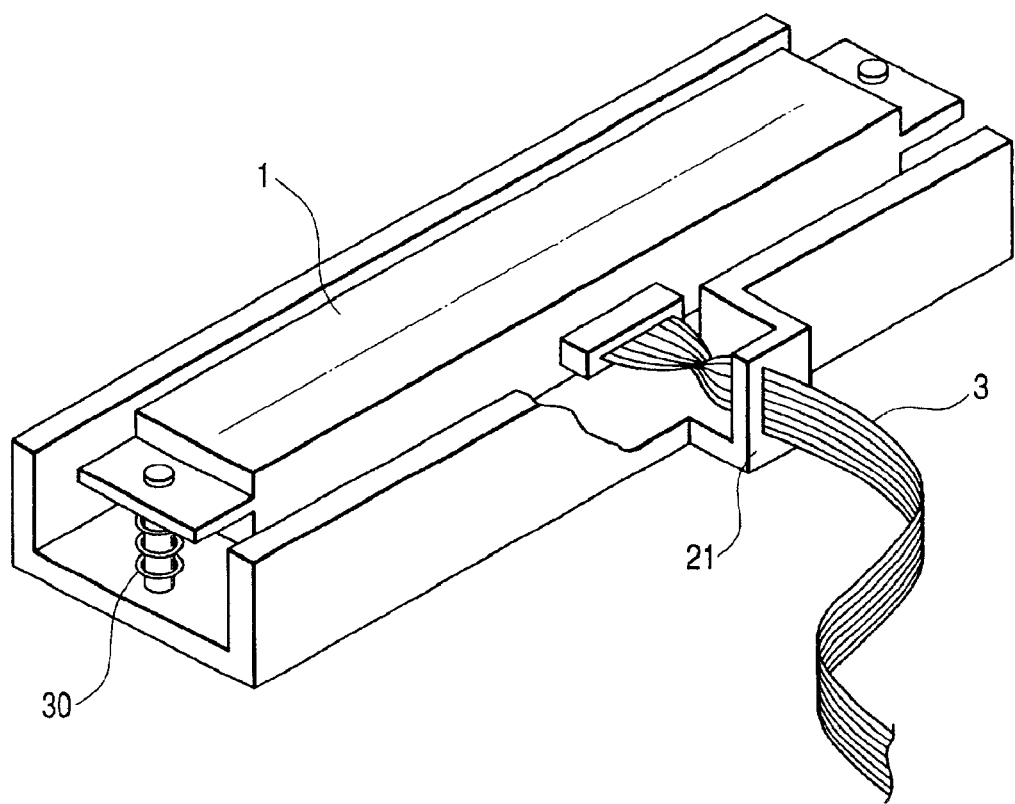
FIG. 9 is a perspective view of the image reading apparatus of the third embodiment.
Figure 10:
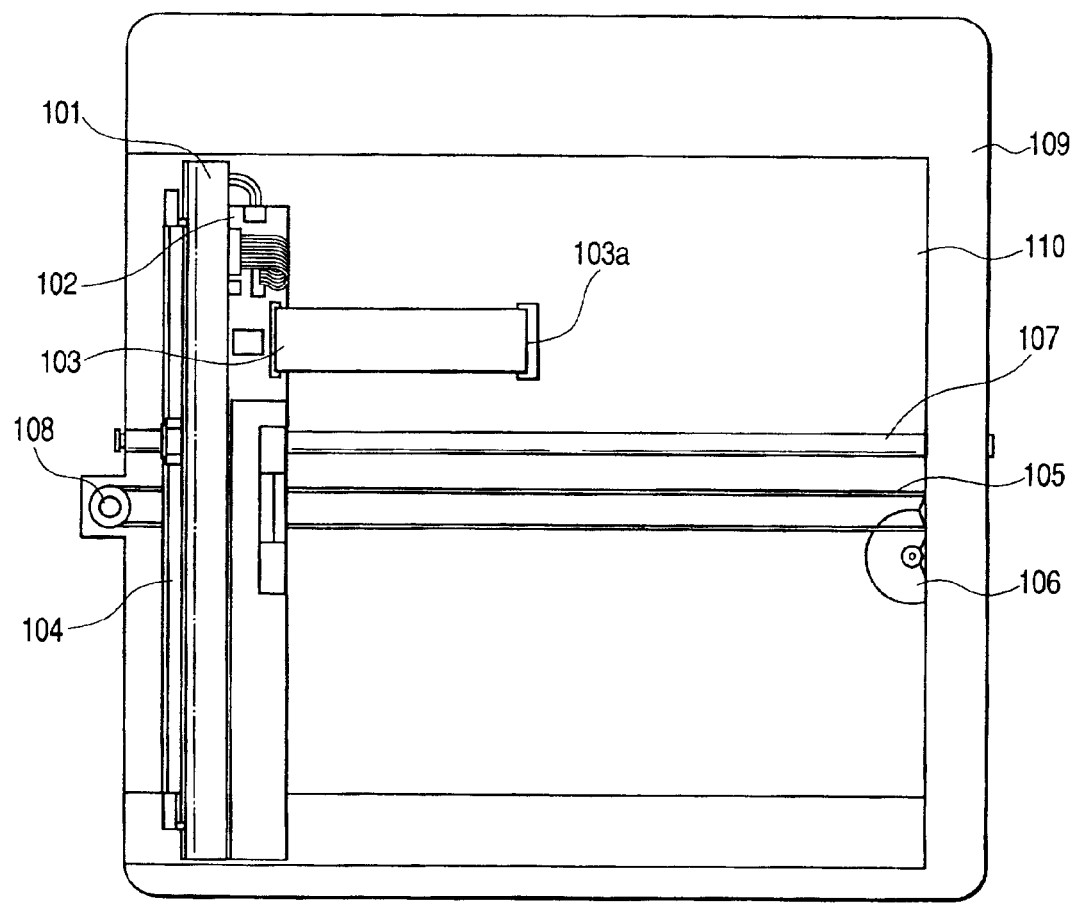
FIG. 10 is a plan view showing a conventional image reading apparatus.

Next, FIG. 8 shows an example of an image forming apparatus using an image reading apparatus. The construction of the image forming apparatus will be briefly described.

Reference numeral 60 designates an original conveying portion on which a plurality of sheet originals are stacked and which separates and conveys them one by one.

The image information of the original conveyed to the image reading position by the original conveying portion is read by the image reading unit 4 as the image reading unit 4 is moved, the read image information signal is transmitted to the image processing portion 50 (also serving as a control portion for image formation) through the flat cable 3. The image processing portion 50 transmits a control signal to an image forming portion 70 so that a toner image according to the input image information signal can be formed on a recording material P. In the image forming portion 70, exposure is performed by an exposure device to form an electrostatic latent image on the surface of a uniformly charged photosensitive drum serving as an image bearing member based on a control signal from the image processing portion 50. And, the electrostatic latent image formed on the surface of the photosensitive drum is developed by a developing device using a toner as a developer, and the toner image thus obtained is electrostatically transferred to the recording material P. After this, the toner image is fixed to the recording material P by a fixing device, and the recording material P is discharged to the exterior of the image forming apparatus, thereby completing a series of image forming operations.

Next, the feature of the present invention will be described.

The flat cable 3 makes an inflecting movement within the space in which the carriage 4 reciprocates, so that there is no need to provide a special space for the flat cable 3, and it is possible to realize an image reading apparatus which is compact in size.

Electric current flows through the flat cable 3 to transmit an image information signal to the image processing portion as described above. Since the surface of the flat cable is coated with resin, static electricity is likely to be induced in the flat cable 3 due to the influence of this electric current.

Unless the interior of the image reading apparatus is perfectly closed to the exterior, an air flow from outside is more or less generated. As a result, a very small quantity of dust borne upon the air is allowed to adhere to the surface of the flat cable 3 bearing static electricity. In the end, the dust accumulated on the flat cable 3 is blackened like soot.

Figure 11:
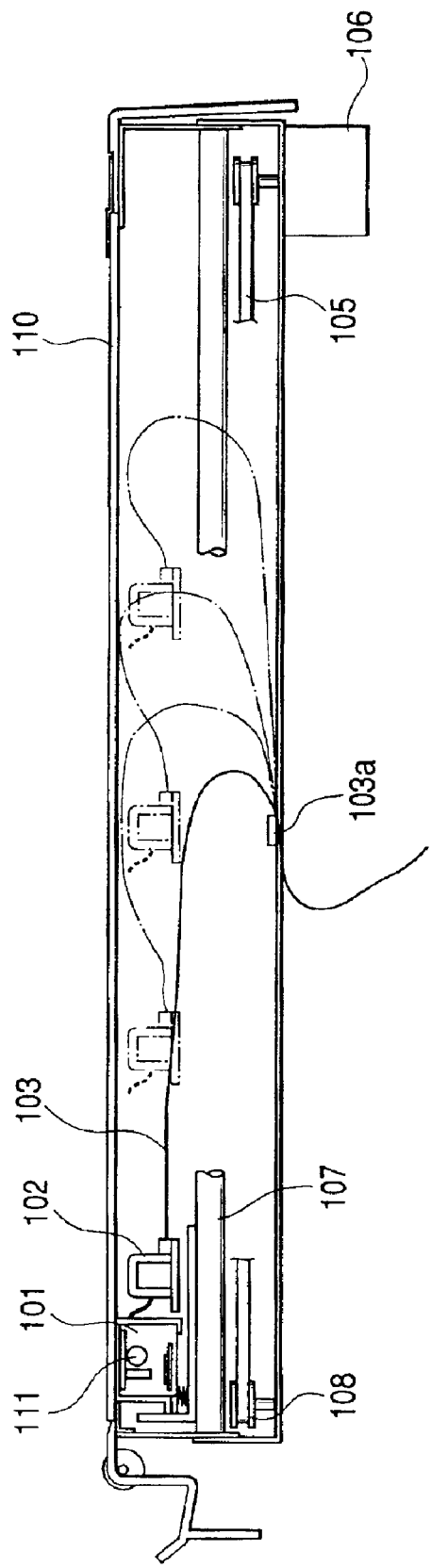
FIG. 11 is a sectional view of the conventional image reading apparatus.

In the case of a conventional apparatus in which the entire flat portion of the flat cable is in contact with the back surface of the original glass stand (See FIG. 11), the dust on the flat cable is allowed to adhere to the back surface of the original glass stand, which may lead to defective image reading.

The flat portion of the flat cable 3 (i.e., the width direction of the flat cable) of this embodiment, in contrast, is perpendicular to the original glass stand 10, as shown in FIG. 2, and the flat cable 3 is inflected within the space extending horizontally so as to be parallel to the original glass stand 10. This makes it possible to make the contact area between the flat cable 3 and the original glass stand 10 as small as possible. Preferably, the flat cable can make a flexural motion without coming into contact with the original glass stand 10.

Thus, even if the surface of the flat cable 3 is blackened and soiled as a result of a very small quantity of dust borne upon the air adhering thereto, it is possible to minimize the soiling of the back surface of the original glass stand 10 due to the flat cable 3, and more preferably, prevent the back surface of the original glass stand 10 from being soiled. Thus, it is possible to prevent defective image reading by the CIS 1.

(Second Embodiment)

Figure 3:
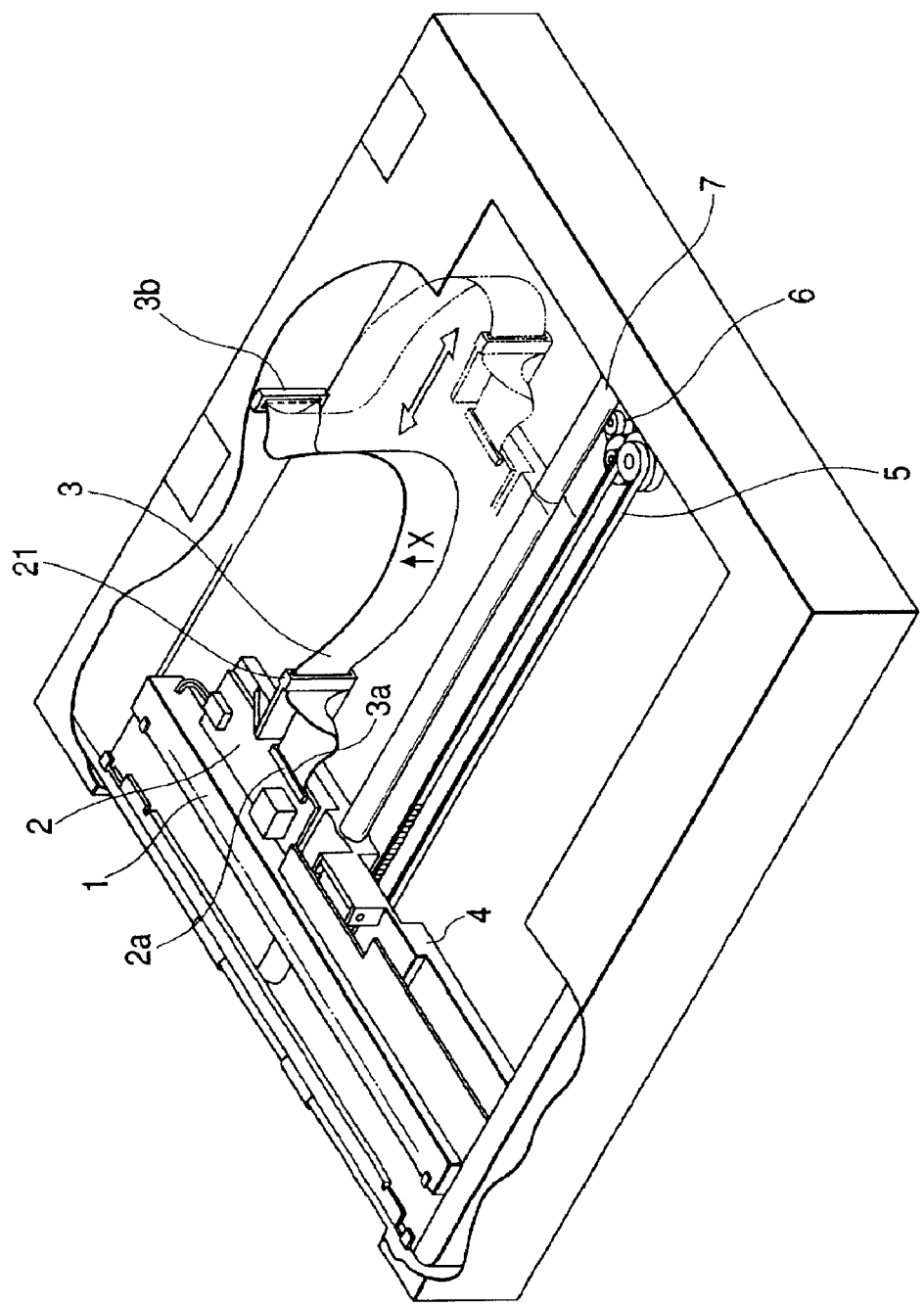
FIG. 3 is a perspective view showing an image reading apparatus according to a second embodiment of the present invention.

FIG. 3 shows the second embodiment of the present invention. The components which are the same as those of the first embodiment are designated by the same reference numerals, and a description of such components will be omitted. FIG. 3 shows the construction of an image reading apparatus provided with a guide member 21 serving as a support portion for twisting the flat portion of the flat cable 3 in a direction perpendicular to the original glass stand 10.

The guide member 21 is detachably mounted to the carriage 4, and serves to twist the flat portion of the flat cable 3, which is horizontally connected to the inverter circuit board 2, in a direction perpendicular to the original glass stand 10.

The guide member 21 also serves to secure the flat cable 3 in position. That is, as the carriage 4 reciprocates, the CIS 1 undergoes slight vertical oscillation, with the result that the flat cable 3 can also oscillate. In this embodiment, however, the guide member 21 maintains the connection between the end portion 3a, serving as the connecting portion, and the connector 2a, thereby preventing failure.

The guide member 21 may be provided on the inverter board 2.

Due to this arrangement, the flat cable 3 is bent by the guide member 21 such that its flat portion is perpendicular to the original glass stand 10. Thus, the flat cable 3 can make a flexural motion without coming into contact with the original glass stand 10, and, even when a very small quantity of dust borne upon the air is allowed to adhere to the surface of the flat cable 3 to blacken and soil it, the stain of the flat cable 3 does not adhere to the back surface of the original glass stand 10 to cause defective image reading.

(Third Embodiment)

Figure 4:
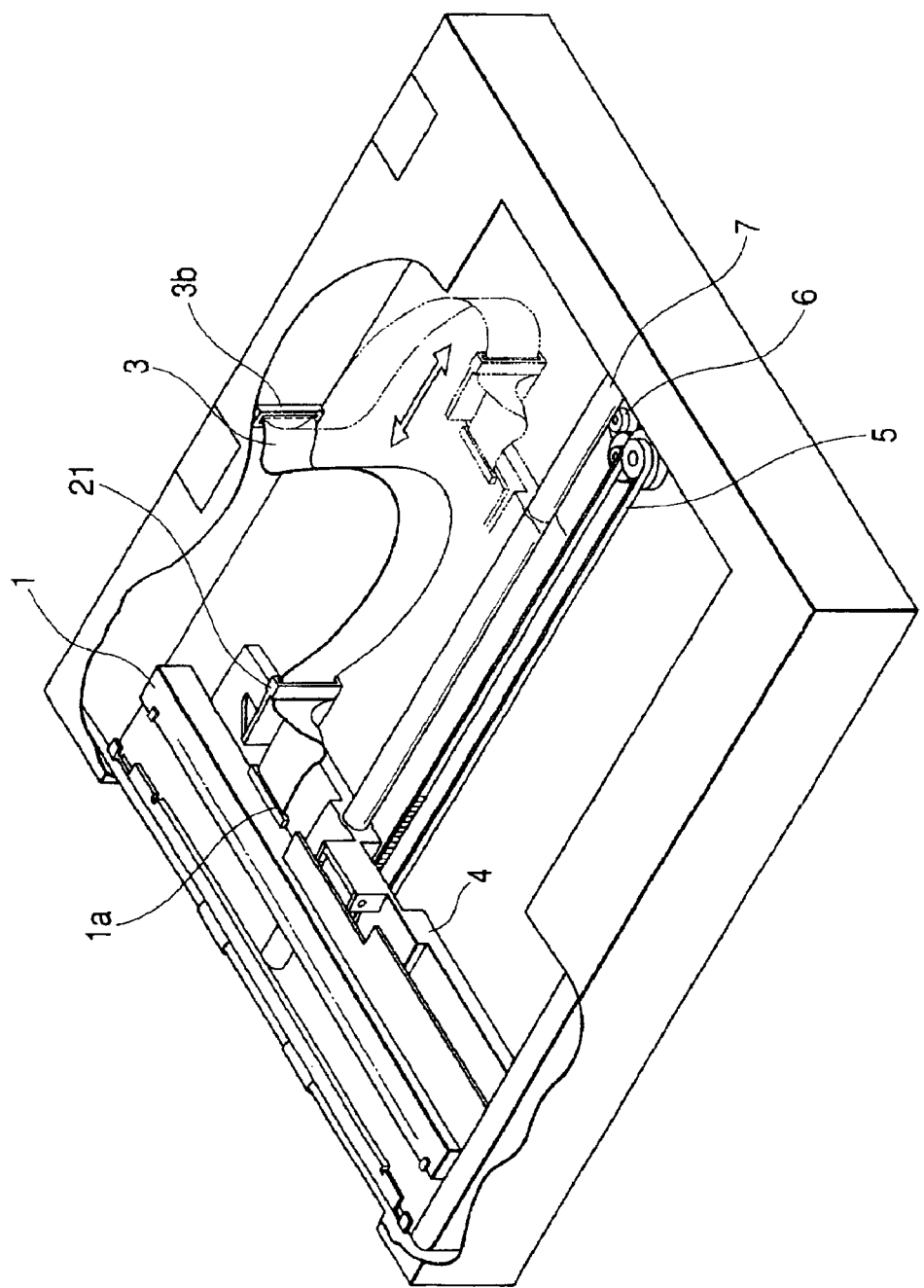
FIG. 4 is a perspective view showing an image reading apparatus according to a third embodiment of the present invention.

FIG. 4 shows the third embodiment of the present invention. The components which are the same as those of the first embodiment are designated by the same reference numerals, and a description of such components will be omitted. FIG. 4 is a perspective view of an image reading apparatus of the type which adopts an LED light source as the light source for the CIS 1.

Since the light source consists of an LED, there is no need to provide the inverter circuit board 2. Thus, the flat cable 3 can be directly connected to the connector 1a of the CIS 1 without using any central circuit board like the inverter circuit board 2.

The guide member 21 secures the flat cable 3 in position. At the same time, the guide member 21 twists the flat portion of the flat cable 3 from the horizontal position, in which it is parallel to the original glass stand 10, into the vertical position in which it is perpendicular to the original glass stand 10. Since the CIS 1 is elastically supported on the carriage by a spring, there is the possibility of the CIS 1 undergoing slight vertical oscillation when the CIS 1 is caused to slightly oscillate in the vertical direction by the reciprocation of the carriage. In this embodiment, however, the flat cable is supported and secured in position by the guide member, so that it is possible to prevent the flat cable from oscillating and coming into contact with the back surface of the original glass stand.

Due to this arrangement, in which the flat cable 3 is bent by the guide member 21 such that the flat portion thereof is perpendicular to the original glass stand 10, it is possible for the flat cable 3 to be inflected without coming into contact with the original glass stand 10. Thus, even if a very small quantity of dust borne upon the air is allowed to adhere to the surface of the flat cable 3 to blacken and soil it, the stain of the flat cable 3 does not adhere to the back surface of the original glass stand 10 to cause defective image reading.

(Fourth Embodiment)

Figure 5:
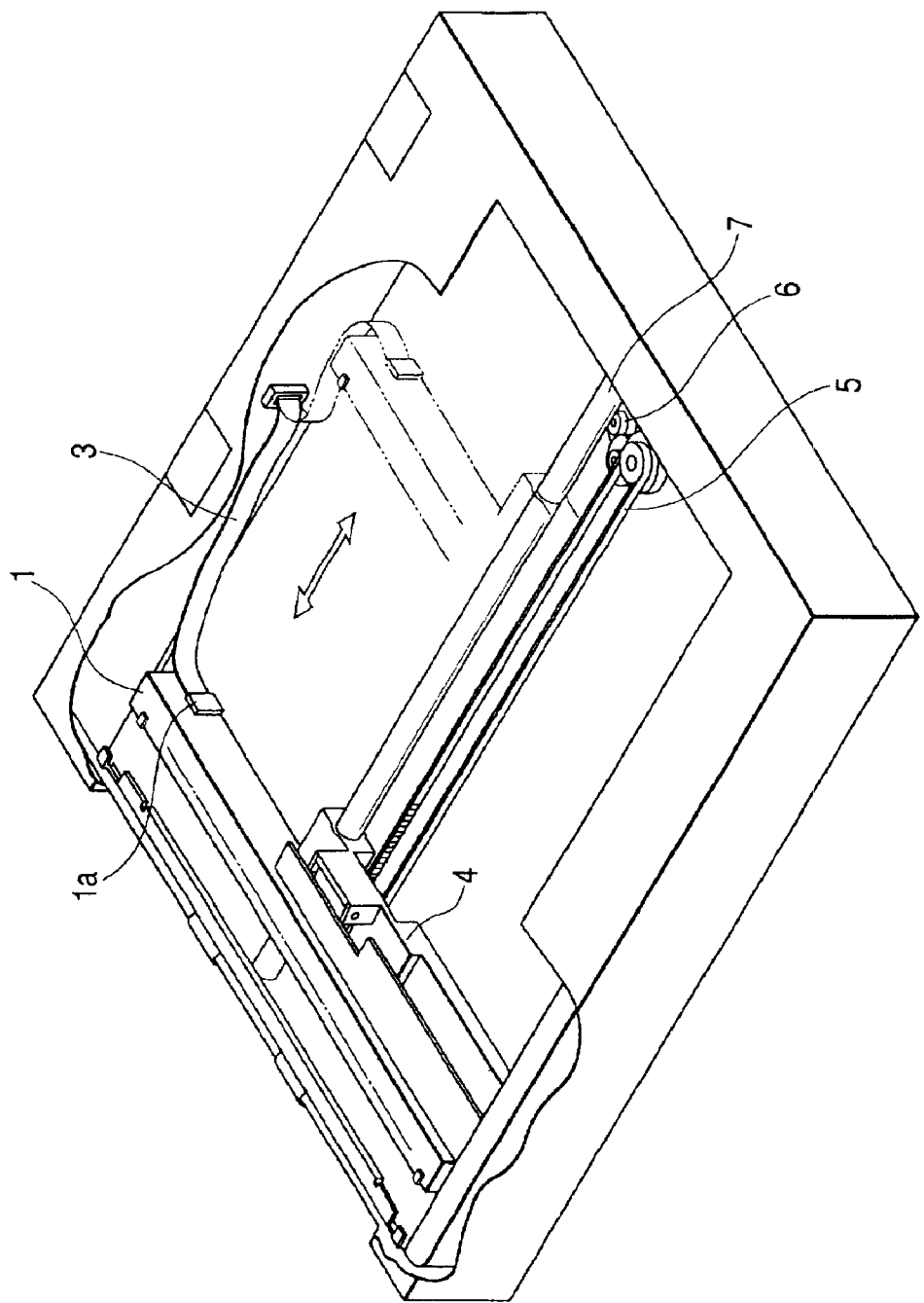
FIG. 5 is a perspective view showing an image reading apparatus according to a fourth embodiment of the present invention.

FIG. 5 shows the fourth embodiment of the present invention. The components which are the same as those of the first embodiment are designated by the same reference numerals, and a description of such components will be omitted. In the example shown in FIG. 5, an LED light source (not shown) and a sensor of a resolution of approximately 200 to 300 dpi (not shown) are used in the CIS 1.

Due to the low resolution, the flat cable 3 of this apparatus can have a width of 25 mm or less. The flat cable 3 is directly connected to the CIS 1 so as to be perpendicular thereto, and is led to the exterior of the image reading apparatus without being twisted.

Figure 6:
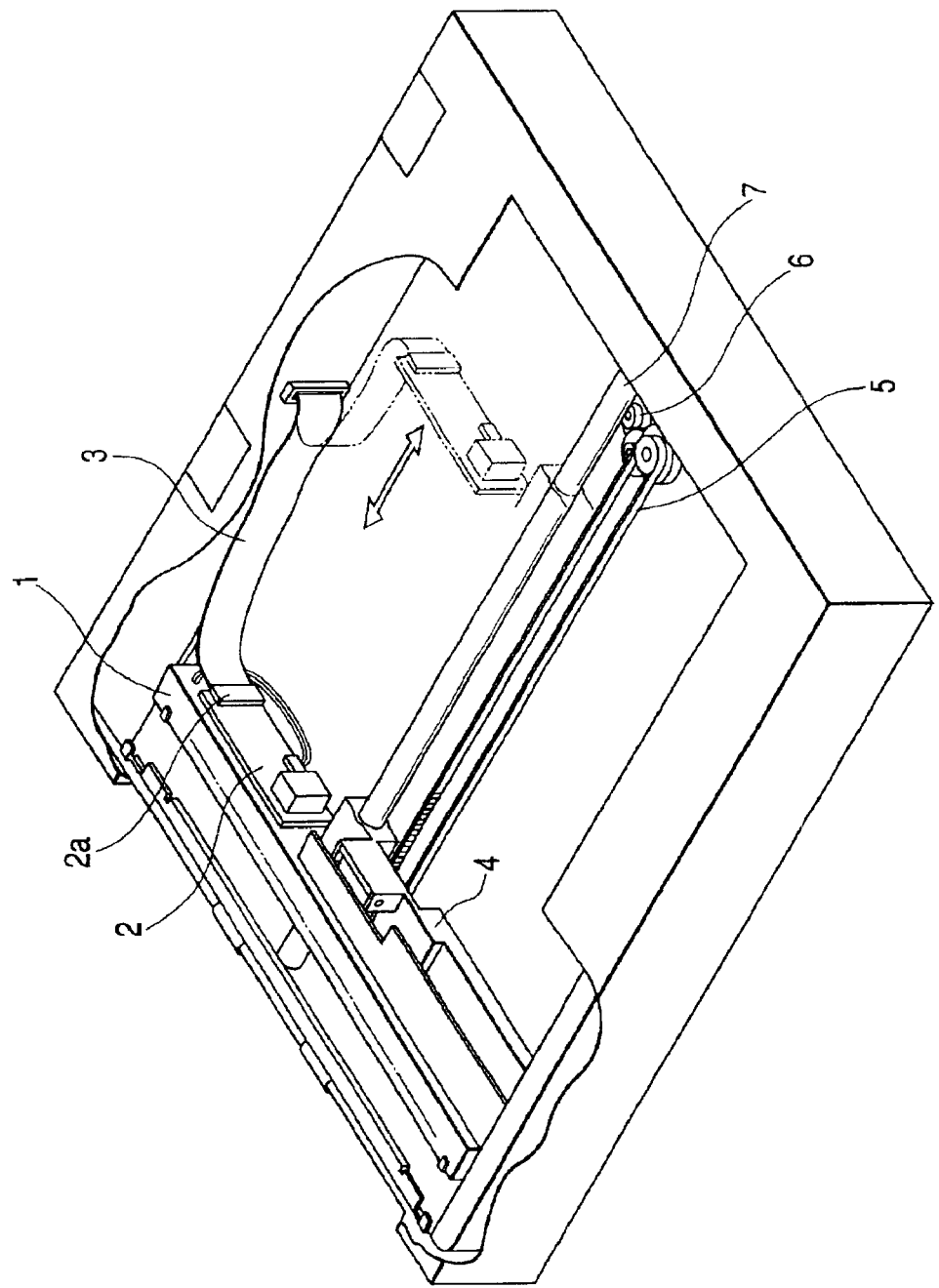
FIG. 6 is a perspective view of the image reading apparatus of the fourth embodiment.

The example shown in FIG. 6 adopts, like the above-described embodiments, a CIS 1 of a resolution of 400 to 600 dpi. This is applicable to cases in which the depth (height) of the image reading apparatus is large.

Since the inverter circuit board 2 can be arranged vertically, the flat cable 3 is connected to the inverter circuit board 2 such that the wide, flat portion of the flat cable 3 is maintained in the vertical position in which it is perpendicular to the original glass stand 10. In this case also, the flat cable 2 is led to the exterior of the image reading apparatus without being twisted.

Due to this arrangement, in which the flat cable 3 is arranged such that the flat portion thereof is perpendicular to the original glass stand 10, it is possible for the flat cable 3 to be inflected without coming into contact with the original glass stand 10. Thus, even if a very small quantity of dust borne upon the air is allowed to adhere to the surface of the flat cable 3 to blacken and soil it, the stain of the flat cable 3 does not adhere to the back surface of the original glass stand 10 to cause defective image reading.

(Fifth Embodiment)

Figure 7:
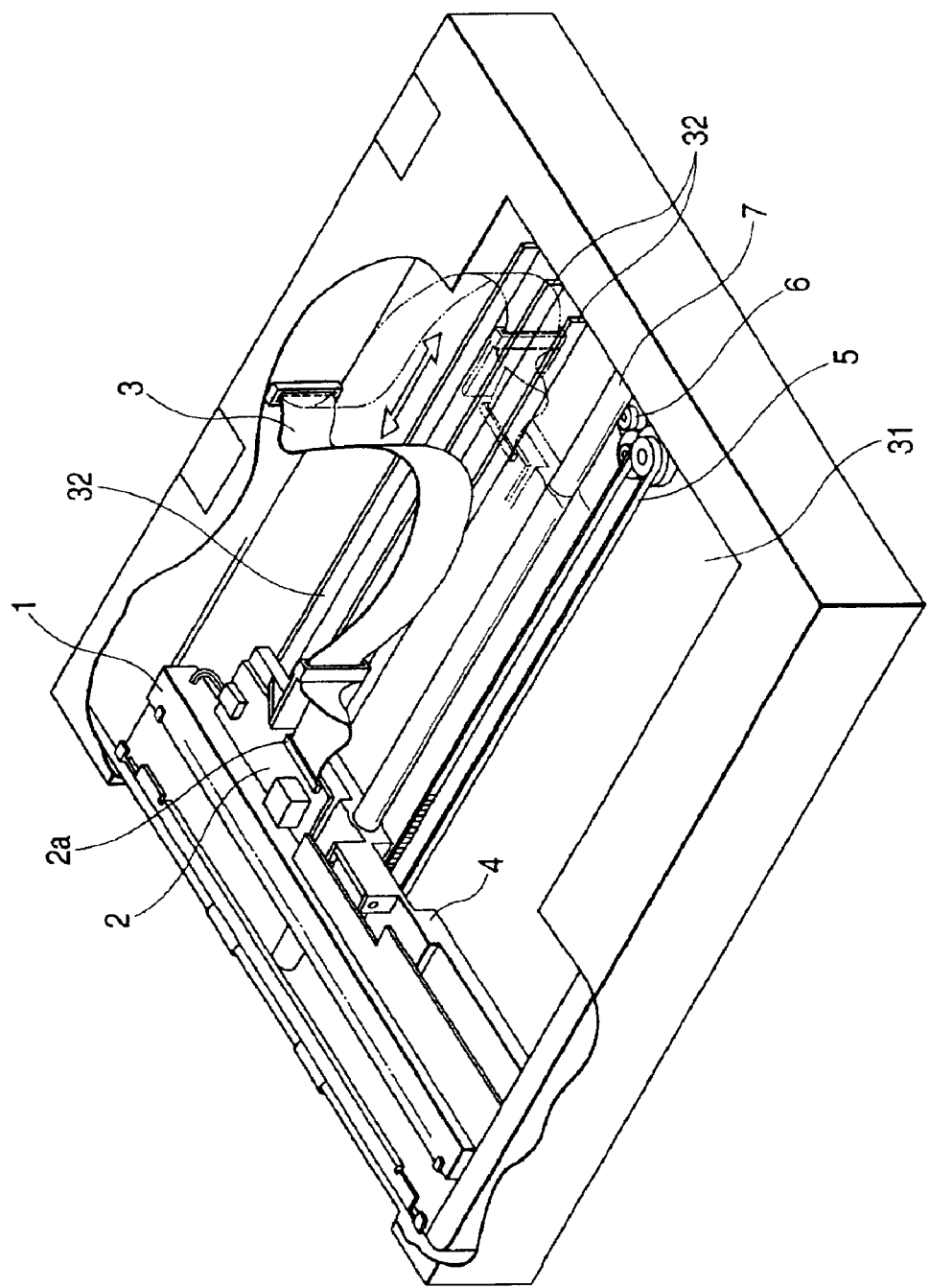
FIG. 7 is a perspective view showing an image reading apparatus according to a fifth embodiment of the present invention.

FIG. 7 shows the fifth embodiment of the present invention. The components which are the same as those of the first embodiment are designated by the same reference numerals, and a description of such components will be omitted. In the example shown in FIG. 7, three rib-like protrusions 32 serving as protecting members are provided on the bottom plate 31 on the opposite side of the original glass stand 10 of the image reading apparatus.

When the flat cable 3 is arranged in the vertical position in which the flat portion thereof is perpendicular to the original glass stand 10, the flat cable 3 is allowed to come into contact with the apparatus bottom plate 31 due to its flexibility, with the result that an unusual noise is generated by the edge portion of the flat cable 3 and the bottom plate 31, the flat cable being thereby worn. When the wear takes place intensely, there is the danger of the flat cable 3 being damaged.

In view of this, ribs are formed of a resin material providing slidability, such as polyacetal, in order to prevent the cable 3 from coming into direct contact with the apparatus bottom plate 31. The ribs 32, serving as regulating members, are arranged on the apparatus bottom plate 31 so as to be parallel to the sub-scanning direction. It is desirable that the upper portions of the ribs 32 receive the edge portion of the flat cable 3. That is, the coefficient of dynamic friction between the cable 3 and the ribs 32 is smaller than the coefficient of dynamic friction between the cable 3 and the apparatus bottom plate 31 (when no ribs 32 are provided, allowing the cable to slide on the apparatus bottom plate), whereby it is possible to prevent wear of the flat cable 3 and generation of an unusual noise.

When the height of these ribs 32 is large, it is possible to arrange on the bottom plate 31 protruding objects, such as a screw and an original size detecting sensor (not shown), which are lower than the ribs 32 even within the inflecting range for the flat cable 3.

Due to the provision of the ribs 32, it is possible to prevent the flat cable 3 from coming into direct contact with the apparatus bottom plate 31.

What is claimed is:

1. An image reading apparatus comprising:

an image reading unit for reading image information of an original resting on an original resting portion; and a flat cable electrically connecting the image reading unit to a main body of the image reading apparatus to transmit the image information read by the image reading unit to the main body of the image reading apparatus, wherein, at a time of reading, the image reading unit moves along the original resting portion, and wherein a width direction of the flat cable is perpendicular to an original resting surface so that the flat cable is flexible in a direction parallel to the original surface.

2. An image reading apparatus according to claim 1, further comprising a regulating member which prevents the flat cable from coming into contact with a bottom portion of the main body of the image reading apparatus.

3. An image reading apparatus according to claim 2, wherein a coefficient of friction between the flat cable and the regulating member is smaller than a coefficient of friction between the flat cable and the bottom portion of the main body of the image reading apparatus.

4. An image reading apparatus according to claim 3, wherein the regulating member is a rib provided on the bottom portion of the main body of the image reading apparatus so as to extend in a direction in which the image reading unit moves.

5. An image reading apparatus according to claim 1, wherein the image reading unit is provided with a support portion which supports the flat cable such that the width direction of the flat cable is perpendicular to the original resting surface.

6. An image reading apparatus according to claim 5, wherein the image reading unit is provided with an image reading sensor for reading the image information of the original, and the flat cable is connected to the image reading sensor such that the width direction of the flat cable is parallel to the original resting surface.

7. An image reading apparatus according to claim 1, wherein the flat cable does not come into contact with a back surface of the original resting portion when the image information is read by the image reading unit.

8. An image reading apparatus according to claim 1, wherein, at the time of reading, the image reading unit slides on a back surface of the original resting portion.

9. An image reading apparatus according to claim 8, wherein a distance between the back surface of the original resting portion and a bottom surface of the main body of the image reading apparatus is not more than 50 mm.

* * * * *